United States Patent [19]

Sawyer et al.

[11] Patent Number: 4,508,989
[45] Date of Patent: Apr. 2, 1985

[54] CORE ELEMENT FOR ELECTRODYNAMIC ROTARY MACHINE

[75] Inventors: Carleton E. Sawyer, Littleton; Hugh C. Masterman, Westford, both of Mass.

[73] Assignee: Display Components, Inc., Westford, Mass.

[21] Appl. No.: 495,962

[22] Filed: May 19, 1983

[51] Int. Cl.³ .............................................. H02K 3/00
[52] U.S. Cl. ................................... 310/184; 310/188; 310/198; 310/216
[58] Field of Search .............................. 310/198–208, 310/187, 188, 180, 184, 216, 211, 212, 179, 192, 166, 171, 111, 261, 254, 258, 259; 318/496

[56] References Cited

U.S. PATENT DOCUMENTS

| | | | |
|---|---|---|---|
| 2,240,652 | 5/1941 | Jenkins | 310/180 |
| 2,679,605 | 5/1954 | Kilgore | 310/111 |
| 2,827,582 | 3/1958 | Krebs | 310/202 |
| 2,905,840 | 9/1959 | Dunn | 310/202 |
| 3,001,127 | 9/1961 | Pitches | 310/111 |
| 3,137,800 | 6/1964 | Young | 310/212 |
| 3,204,167 | 8/1965 | Zigler | 310/166 |
| 3,697,791 | 10/1972 | Kilgore | 310/111 |
| 3,778,652 | 12/1973 | Endress | 310/211 |
| 3,808,568 | 4/1974 | Sawyer | 335/213 |
| 4,241,274 | 12/1980 | Brammerlo | 310/216 |
| 4,264,836 | 4/1981 | Dukshtau | 310/216 |

OTHER PUBLICATIONS

"Semiconductor A-C Current Motor Drives & Energy Conservation"; by D. J. Ben Daniel et al; Science; vol. 206; Nov. 16, 1979; pp. 773–776.

"After 13 Years of Hot Windings Efficient Electric Motors Return", Product Engineering; May, 1977; pp. 43–46.

"Study of Variable Slot Pitch in Electric Machinery", A Report to Energy Research & Development Adm., by J. L. Kirtley, Jr.; Jul. 7, 1977.

"Standard Handbook for Electrical Engineers", by D. G. Fink et al., 1969, 10th Edition, pp. 18–17.

Primary Examiner—R. Skudy
Attorney, Agent, or Firm—Schiller & Pandiscio

[57] ABSTRACT

An improved magnetic core element for use in an electrodynamic rotary machine. The core element, either a stator or rotor depending upon the design of the machine, is provided with a slot distribution such that when the rotor rotates with respect to the stator and a balanced energy field is provided therebetween, at least the lowest generated harmonics, will be substantially zero.

23 Claims, 1 Drawing Figure

CORE ELEMENT FOR ELECTRODYNAMIC ROTARY MACHINE

The present invention relates generally to multiple-pole, multiple-slot rotary machines and methods of making such machines, and more particularly to an improved highly energy efficient magnetic core element for use in such machines.

A 1976 study by Arthur D. Little of Cambridge, Mass., U.S.A. estimated that electric motors consume approximately 64% of all of the electric power generated in the United States. The study shows that in the industrial area alone, polyphase motors in the 1 to 125 horsepower (hp) range absorb approximately 26% of the total U.S. electric power. (For reference to this study see "After 13 Years of Hot Windings Efficient Electric Motors Return"; *Product Engineering*, May, 1977, pp. 43–46; and Ben Daniel, D. J. and David, Jr., E.E., "Semiconductor Alternating-Current Motor Drives and Energy Conservation"; *Science*; Vol. 206, Nov. 16, 1979, pp. 773–776.)

The need for making polyphase motors more efficient is even more striking when one considers the amount of consumption of fuel needed to run these motors. It has been calculated that for many of these motors, three units of input energy are required by a generating plant to produce one unit of ultimate consumption. (See the Product Engineering article cited above).

While various energy-saving techniques have been developed at the manufacturing stage (such as winding controls) and at the ultimate user stage (such as matching the load with a particular motor suited for such a load), these techniques are not exclusive of the techniques utilized by manufacturing designers to make motors more energy efficient. Design changes which have been suggested include adding metal to those portions of the motor subject to magnetic and electric losses, optimizing windings, slots, poles, air gap and in a few cases redesigning the magnetic circuit (see the Product Engineering article cited above). For two approaches for optimizing the slots and poles, see U.S. Pat. Nos. 2,679,605 (issued to Kilgore on May 25, 1954) and 3,697,791 (issued to Kilgore et al on Oct. 10, 1972). The Kilgore patent discloses the idea of minimizing the effects of saturation of the rotor-teeth next to the pole center by widening a few of the rotor slots on one side of and next to the pole center. The Kilgore et al patent teaches the concept of displacing the first slot on the trailing side of each pole face of the rotor away from its normal symmetrical position toward the center of the pole face in order to substantially reduce the radial flux linking the stator conductors. The patentees claim that this reduces the excess stator copper loses due to such flux. U.S. Pat. No. 2,240,652 (issued to Jenkins on May 6, 1941) discloses an electrodynamic machine having asymmetrically shaped pole pieces in a symmetrical distribution or pattern so as to crowd the flux to one side of the pole pieces by armature reaction. U.S. Pat. Nos. 3,137,800 (issued to Young on June 16, 1964) and 3,778,652 (issued to Endress on Dec. 11, 1973) each show irregular slot configurations.

Of all the approaches taken to improve the energy efficiency of motors, the most beneficial is believed to be that which improves the efficiency of the motor at the fundamental physical level, i.e., maximizing the extraction or transfer of usable energy from the electromagnetic field. In many electrodynamic machines in addition to the fundamental component, there are voltage harmonics generated in the electromagnetic field. These harmonics can create detrimental effects in motor operations both in terms of machine performance (since they generate asynchronous flux waves) and efficiency (since they cause added core and $I^2R$ losses). One such approach (illuminated in a July 7, 1977 report by Professor James L. Kirtley, Jr. of the Massachusetts Institute of Technology to the Energy Research and Development Administration on behalf of the assignee of the present invention) for maximizing the extraction of usable energy from the electromagnetic field, is to space current carrying conductors about the periphery of a machine in an optimal pattern so as to reduce losses and harmonic voltage generation in electrodynamic machines. The basis for Professor Kirtley's report was derived from the use of optimum coil distribution in the construction of high quality magnetic deflection yokes for cathode ray tubes so as to produce a more highly uniform magnetic field, and therefore, greater deflection precision than yokes constructed with uniform slot spacings. The particular approach investigated by Professor Kirtley was to provide a specific sinusoidal slot or coil distribution. This latter concept and approach are disclosed and claimed in U.S. Pat. No. 3,808,568 assigned to the present assignee and issued on Apr. 30, 1974 to Carleton E. Sawyer, the co-inventor of the presently claimed invention. As correctly pointed out by Professor Kirtley magnetic deflection yokes are two-phase devices (used for deflecting an electron beam), with two coil distributions arranged to produce two mutually perpendicular fields to one another. In this way the path traveled by the electron beam through the yoke can be easily controlled by two DC currents applied respectively to the two coil distributions. However, the slot distribution used in DC deflection yokes are not appropriate for AC multiple-pole rotary machines, such as three phase generators and motors.

Professor Kirtley correctly states that three-phase AC electrodynamic machines are typically driven by a balanced periodic excitation. The balanced periodic drive makes certain harmonics, which are important when designing stator yokes for DC excitation, unimportant. Professor Kirtley therefore believed that, while he could demonstrate some general features of harmonic fields in three-phase AC electrodynamic machines, it was not possible using the approach disclosed in the Sawyer patent to determine a general rule for optimum slot spacings in such AC machines.

It is therefore an object of the present invention to overcome or substantially reduce the above-noted problems of the prior art.

More specifically, an object of the present invention is to provide an improved magnetic core element for use in an electrodynamic rotary machine.

Another object of the present invention is to provide an improved magnetic core element of an electrodynamic rotary machine having a slot distribution substantially matched for optimum field uniformity.

And another object of the present invention is to provide an improved magnetic core element of an electrodynamic rotary machine having at least the lowest order harmonics substantially reduced to zero.

And still another object of the present invention is to provide an improved energy efficient electrodynamic rotary machine of the type adapted to be driven by a balanced periodic voltage excitation and having at least the lowest ordered harmonics in the electromagnetic field substantially reduced to zero.

And yet another object of the present invention is to provide an improved energy efficient electrodynamic rotary machine of the type adapted to be driven by a balanced periodic voltage excitation, which machine provides a more uniformly constant torque output through each 360° rotation of the rotor.

And still another object of the present invention is to provide an improved method of making an improved magnetic core element of an electrodynamic rotary machine.

These and other objects are achieved by an improved magnetic core element for use in an electrodynamic rotary machine. The core element, either a stator or rotor depending upon the design of the machine, is provided with a slot distribution such that when the rotor rotates with respect to the stator, at least the lowest order harmonics will be substantially zero.

Other objects of the invention will in part be obvious and will in part appear hereinafter. The invention accordingly comprises the processes involving the several steps and the relation and order of one or more of such steps with respect to each of the others, and the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

The FIGURE schematically shows a cross-sectional, radial view through the magnetic core elements of an embodiment of an induction machine designed in accordance with the principles of the present invention.

Figure 1:
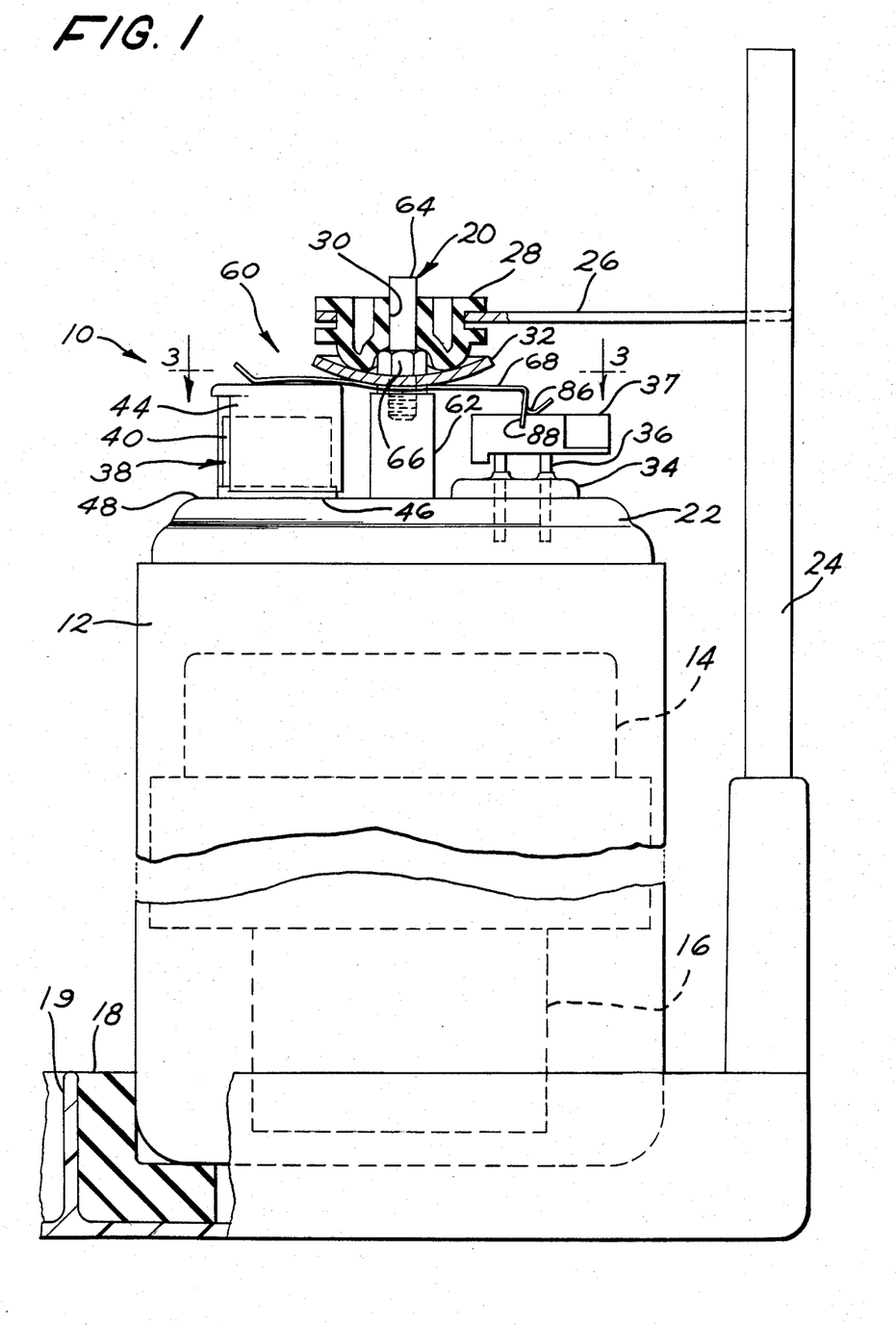
Figure 2:
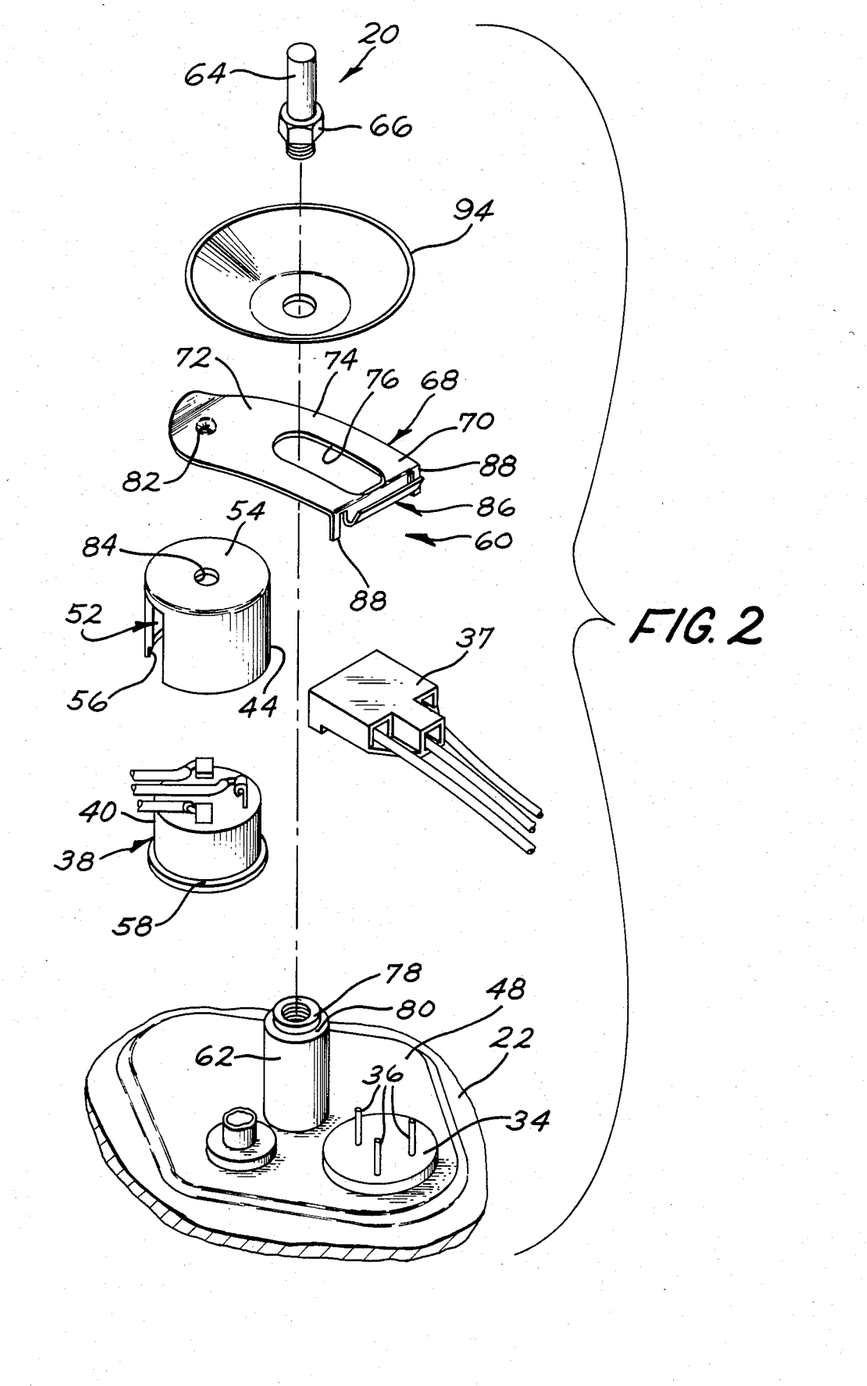
Figure 3:
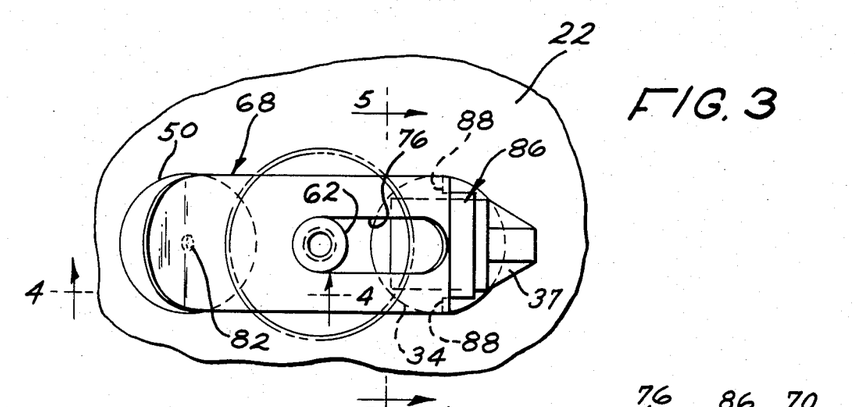
Figure 4:
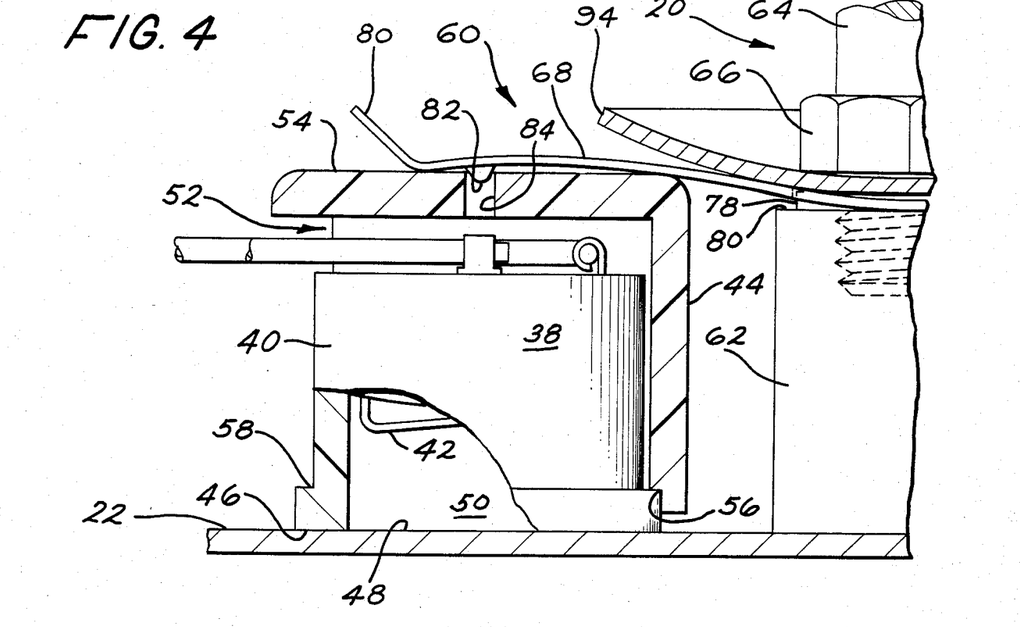
Figure 5:
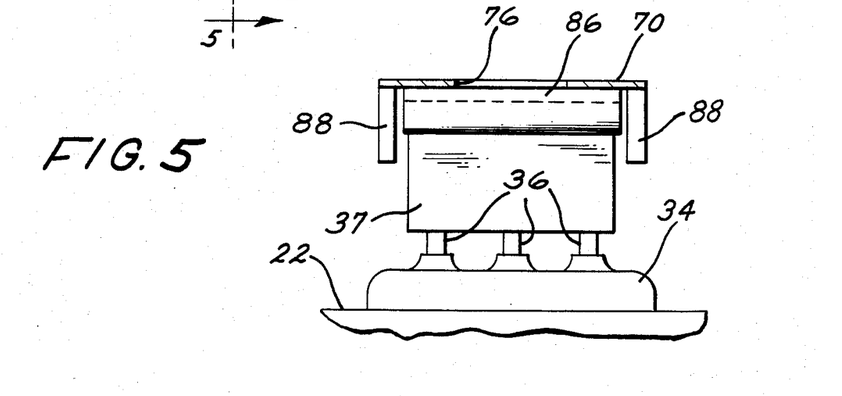

Referring to the drawing the illustrated embodiment of the multi-slot, multi-poled electrodynamic rotary machine of the present invention is a three-phase, two-pole induction-type motor 100 including two magnetic core elements, a rotor 102 and a multi-slotted stator 104. The rotor 102, shown schematically as a squirrel cage rotor, is made in accordance with principles well known in the art. The construction of a squirrel cage rotor may, for example, comprise 28 identical copper or cast aluminum bars solidly connected to connecting end rings on each end. It should be appreciated that other types of rotors can be used. For example, instead of a squirrel cage rotor, alternatively, the rotor can be of the wound type. The rotor is mounted concentrically with and adapted to rotate relative to the stator 104 about the rotation axis 110. The air gap between the rotor and stator is as uniform as possible and for the purposes of analysis hereinafter, the effect of the slots in stator 104 on the air gap will be ignored. The stator 104, shown as including 36 slots, is identical to a standard 36 slot stator of the prior art, except that the inner circumferential distribution of the slots, and thus the coils windings 106 disposed in those slots, has been modified in accordance with the present invention. For purposes of illustration, windings 106 are connected in a manner well known in the art so as to provide a two-pole machine, although the number of poles can vary as well known in the art.

In accordance with the present invention, a slot distribution is provided which reduces the voltage generated lower order harmonics to substantially zero. In determining the particular slot distribution of the improved magnetic core element of the electrodynamic rotary machine, and in particular motor 100, the first observation that can be made is that for a balanced excitation with a sinusoidal signal, the particular energy distribution will exhibit a sinusoidal pattern around the core element, which pattern will provide a peak value for each phase of the excitation signal. The particular location of each peak value for a given phase is dependent upon the number of phases and the peak values of the phases will exhibit symmetry about the axis 110. The multiple phase energy distribution will affect the slot distribution around the core element.

More particularly, it will be seen that the position of a predetermined number of slots will be independent variables, while the position of the remaining number of slots will, by virtue of system symmetry, be dependent upon the location of the initial predetermined number. The exact number of variables or slots having positions which are independent variables is determined by the following relation:

$$N = IP[s/(2(\phi)(p))] \tag{1}$$

wherein:
  $N$ = the number of slots having positions which are independent variables;
  $IP$ = the function "the integer part of";
  $s$ = the total number of slots to be provided in the magnetic core element (e.g., stator in the FIGURE);
  $\phi$ = the total number of phases of the excitation voltage; and
  $p$ = the total number of poles of the machine (e.g., defined by the windings 106 of stator in the FIGURE).

Thus, the number of independent variables relative to slot placement for a three-phase, two-pole device having 36 slots can be easily calculated from equation (1) as being equal to three.

As will be more evident hereinafter, a requirement of the system is that the slot distribution will exhibit a certain symmetry about the 90°–270° axis shown in the FIGURE and about the 0°–180° axis in that FIGURE. The symmetry of the slot distribution is a function of the number of phases $\phi$. More particularly, an equal number of slots must be disposed in each "symmetrical segment". Due to the requirement of symmetry about the 0°–180° and 90°–270° the symmetrical segment can then be defined as:

$$\text{symmetrical segment} = 90°/\phi. \tag{2}$$

Thus, in the embodiment shown in the FIGURE the first three slots will be disposed in a 30° segment, measured from the peak of the sinusoidal function of one phase of the energy distribution that the slot distribution is trying to approximate. If the position of the three slots of the three-phase, two-pole, thirty-six slot device can be determined in one 30° segment, the remaining slots can easily be determined by symmetry imposed by the spatial relationship of the other phases of the energy distribution.

Specifically, if one starts at the peak of the sinusoidal function of one phase of the energy distribution, the slot distribution should follow a cosine-like distribution of $\cos \phi\theta$, wherein $\phi$ is the number of phases, and $\theta$ is the angular position of the slot measured from the initial peak for a particular phase. Thus, by determining the slot positions in one symmetrical segment of the slotted core element (which slot positions by definition are the independent variables), the positions of the remaining slots, (which by definition are the dependent variables) can be determined.

The foregoing will be evident by referring to the illustrated embodiment for a design starting point, the symmetrical segment is assumed to be in the 60° to 90° segment of the stator, measured from the 0° angular position indicated. The first slot 1 is at an angle $\theta_1$, the next slot 2 is at an angle $\theta_2$ and the third slot of the segment is at an angle $\theta_2$, wherein $\theta_1 > \theta_2 > \theta_3$. The next three slots are positioned in the 30° to 60° segment symmetrically with slots 1-3 about the 60° radial line, wherein slot 4 is at an angle $60° - (\theta_3 - 60°)$, or $120° - \theta_3$, slot 5 is at an angle $60° - (\theta_2 - 60°)$, or $120° - \theta_2$, and slot 6 is at an angle $60° - (\theta_1 - 60°)$, or $120° - \theta_1$ due to three phase symmetry. The positions of the slots 7, 8 and 9 in the 0°-30° segment are equally, respectively dependent on $\theta_1$, $\theta_2$ and $\theta_3$ and symmetrical about the 30° radial line with the slots 4, 5 and 6. Specifically, slot 7 is at an angle $30° - (120° - \theta_1 - 30°)$, or $\theta_1 - 60°$; slot 8 is at an angle $30° - (120° - \theta_2 - 30°)$, or $\theta_2 - 60°$; and slot 9 is at an angle $30° - (120° - \theta_3 - 30°)$, or $\theta_3 - 60°$. Continuing around the stator the remaining slots 10-36 will have positions as a function of either $\theta_1$, $\theta_2$ or $\theta_3$ due to the three phase symmetry, wherein slots 10, 11 and 12 will be positioned symmetrically with slots 7, 8 and 9 about the 0° or 360° radial line; slots 10, 11 and 12 will be positioned symmetrically with slots 13, 14 and 15 about the 330° radial line; slots 13, 14 and 15 are symmetrical with slots 16, 17 and 18 about the 300° radial line, etc. The positions of the above slots are summarized and the positions of the remaining slots are indicated as a function of $\theta_1$, $\theta_2$ or $\theta_3$ in the following table:

TABLE 1

| SLOT NUMBER | ANGULAR POSITION (°) |
|---|---|
| 1 | $\theta_1$ |
| 2 | $\theta_2$ |
| 3 | $\theta_3$ |
| 4 | $120° - \theta_3$ |
| 5 | $120° - \theta_2$ |
| 6 | $120° - \theta_1$ |
| 7 | $\theta_1 - 60°$ |
| 8 | $\theta_2 - 60°$ |
| 9 | $\theta_3 - 60°$ |
| 10 | $420° - \theta_3$ |
| 11 | $420° - \theta_2$ |
| 12 | $420° - \theta_1$ |
| 13 | $\theta_1 + 240°$ |
| 14 | $\theta_2 + 240°$ |
| 15 | $\theta_3 + 240°$ |
| 16 | $360° - \theta_3$ |
| 17 | $360° - \theta_2$ |
| 18 | $360° - \theta_1$ |
| 19 | $\theta_1 + 180°$ |
| 20 | $\theta_2 + 180°$ |
| 21 | $\theta_3 + 180°$ |
| 22 | $300° - \theta_3$ |
| 23 | $300° - \theta_2$ |
| 24 | $300° - \theta_1$ |
| 25 | $\theta_1 + 120°$ |
| 26 | $\theta_2 + 120°$ |
| 27 | $\theta_3 + 120°$ |
| 28 | $240° - \theta_3$ |
| 29 | $240° - \theta_2$ |
| 30 | $240° - \theta_1$ |
| 31 | $\theta_1 + 60°$ |
| 32 | $\theta_2 + 60°$ |
| 33 | $\theta_3 + 60°$ |
| 34 | $180° - \theta_3$ |
| 35 | $180° - \theta_2$ |

TABLE 1-continued

| SLOT NUMBER | ANGULAR POSITION (°) |
|---|---|
| 36 | $180° - \theta_1$ |

It is now only necessary to determine $\theta_1$, $\theta_2$ and $\theta_3$ for providing the entire slot distribution of the stator 104. In accordance with the present invention the particular slot positions define by $\theta_1$, $\theta_2$, and $\theta_3$ are chosen so as to approach as closely as possible a pure sinusoidal current boundary condition for each phase. This can be accomplished by reducing at least the lower harmonics to zero or as near to zero as possible. The general approach for zeroing harmonics is therefore to first express the current distribution as a Fourier expansion. The use of a Fourier expansion to express the current distribution is known. The general Fourier series expansion for the current distribution can be expressed as a function $g(\theta)$ as follows:

$$g(\theta) = a_0/2 + a_1 \cos(\theta) + a_2 \cos(2\theta) + a_3 \cos(3\theta) + \ldots + a_n \cos(n\theta) + b_1 \sin(\theta) + b_2 \sin(2\theta) + b_3 \sin(3\theta) + \ldots b_n \sin(n\theta) \quad (3)$$

If by definition the current distribution of one phase peaks at 90° from the reference point 0°, all of the cosine terms in equation (3) will sum to zero, leaving the following equation (4):

$$g(\theta) = b_0/2 + b_1 \sin(\theta) + b_2 \sin(2\theta) + b_3 \sin(3\theta) + \ldots b_n \sin(n\theta) \quad (4)$$

It can further be shown that all of the even harmonics of equation (4) will be equal to zero. In general, the definition of the Fourier coefficients $b_n$ is as follows:

$$b_n = \frac{1}{\pi} \int_{-\pi}^{\pi} I(\theta) \sin(n\theta) \, d\theta \text{ for each } n. \quad (5)$$

If the windings are assumed to be impulses:

$$I(\theta) \triangleq \sum_m I_m \delta(\theta - \theta_m), \quad (6)$$

wherein
$I_m$ = the current in the mth slot; and
$\theta_m$ = the position of the mth slot.
Substituting equation (6) into equation (5)

$$b_n = \frac{1}{\pi} \sum_m I_m \sin(n\theta_m). \quad (7)$$

Thus, if a positive current in the coil of slot 3 equals $I_m \sin n\theta_3$, then the contribution from slot 3 is defined as follows:

$$\Sigma I \sin(n\theta) = I \sin n\theta_3 + I \sin n(180° - \theta_3) - I \sin n(-\theta_3) - I \sin n(\theta_3 - 180°) \quad (8)$$

Using the trigonometric identity:

$$\sin(a - b) = (\sin a)(\cos b) - (\cos a)(\sin b) \quad (9)$$

Equation (8) becomes:
$$\Sigma I \sin n\theta = I \sin n\theta_3 + I \sin n(180°) \cos n\theta_3 - I \cos n(180°) \sin n\theta_3 + I \sin n\theta_3 - I \sin n\theta_3 \cos n(180°) + I \cos n\theta_3 \sin n(180°) \quad (10)$$

Since sin n(180°) always equals zero for any integer of n, equation (10) reduces to:

$$\Sigma I \sin n\theta = 2I \sin n\theta_3 - 2I \sin n(\theta_3) \cos n(180°) \quad (11)$$

The term cos n(180°) equals $-1$ for odd integers reducing equation (11) to:

$$\Sigma I \sin n\theta = 4I \sin n\theta_3, \quad (12)$$

when n is an odd integer.

However, the term cos n (180°) equals $+1$ for even integers reducing equation (11) to:
$$\Sigma I \sin n\theta = 0, \quad (13)$$

when n is an even integer.

It should be appreciated that the same proof applies for the remaining slots since the symmetrical relationships of the remaining slots about the 0°-180° axis and 90°-270° axis are the same. From this it can be generalized that the current distribution will be zero for even harmonics, while four times the value at any point of the stator for odd harmonics. Thus, equation (4) as an expression of current distribution of one phase becomes:

$$g(\theta) = b_1 \sin(\theta) + b_3 \sin(3\theta) + b_5 \sin(5\theta) + b_7 \sin(7\theta) + b_9 \sin(9\theta) + b_{11} \sin(11\theta) + \ldots + b_n \sin(n\theta) \quad (14);$$

wherein n will now only be an odd integer.

In order to provide a slot distribution which more closely approximates the fundamental component $b_1 \sin(\theta)$, it remains to reduce to zero or near zero, as many of the remaining odd harmonic components as possible. This is accomplished by selecting the positions of the slots in each symmetrical segment so that the particular harmonic components of interest generated at each slot will substantially cancel one another.

As a necessary criterion in three-phase devices of the type described with reference to the FIGURE, when all three phases are considered there is a natural cancellation of the (6c+3) harmonic terms (wherein c is any integer including zero) in a given phase by an equal and opposite effect of the other two phases. This cancellation of the third, ninth, fifteenth, etc. harmonic terms is independent of the winding distribution of a given phase. However, it has been determined that by reducing these (6c+3) harmonics within a given phase that a corresponding reduction in the remaining harmonics (i.e., the fifth, seventh, eleventh, etc.) often occurs. Thus, one aspect of the present invention is to provide a technique for reducing these (6c+3) harmonics so that the remaining harmonics are reduced.

Developing criterion that will always render the (6c+3) harmonics to be zero or near zero for a given phase, it can be shown that the number of coil turns for each phase in each slot is equal to the algebraic sum of the coil turns for the respective slots whose position is dependent upon the same $\theta$ in each 90° quadrant, as readily determined from Table 1 above. Specifically, the coil turns in slot 1 for a phase equals the algebraic sum of the coil turns in slots 6 and 7 for that same phase. This relationship can be expressed as follows:

$$n_1 = n_6 + n_7 \quad (15)$$

wherein n is the number of coil turns for a phase, the subscript indicates the particular slot, and the direction of turns in one direction is considered positive, while in the other direction the number of turns is considered negative. In a similar manner, for each phase the following relationships will be true:

$$n_2 = n_5 + n_8 \quad (16)$$

$$n_3 = n_4 + n_9 \quad (17)$$

$$n_{10} = n_{15} + n_{16} \quad (18)$$

$$n_{11} = n_{14} + n_{17} \quad (19)$$

$$n_{12} = n_{13} + n_{18} \quad (20)$$

$$n_{19} = n_{24} + n_{25} \quad (21)$$

$$n_{20} = n_{23} + n_{26} \quad (22)$$

$$n_{21} = n_{22} + n_{27} \quad (23)$$

$$n_{28} = n_{33} + n_{34} \quad (24)$$

$$n_{29} = n_{32} + n_{35} \quad (25)$$

$$n_{30} = n_{31} + n_{36} \quad (26)$$

This specific adjustment of the number of wire turns will guarantee that the (6c+3) harmonics will be zero within a given phase. It should be understood that Equations (15), (16) and (17) impose a constraint on the number of turns for the (6c+3) harmonics to be zero for any uniform or nonuniform slot distribution. In order to reduce the remaining odd harmonics in accordance with the present invention the adjustment of the number of wire turns is made to an existing design in which a uniform slot distribution exists, so that a given number of turns per slot per phase is given. The number of turns in each slot per phase is then adjusted (within the constraints of Equations (15)-(26) by empirically determining which combination of coil turns within the constraints indicated will reduce the remaining odd harmonics (except for the (6c+3) harmonics) and minimize the amount of slot shift required (i.e., the amount $\theta_1$, $\theta_2$ and $\theta_3$ are shifted from a uniformly spaced position to provide the 3 phase machine shown in the FIGURE). It should also be noted that practical design considerations require that for equal slot dimensions $n_1 = n_2 = n_3$, although $n_4$, $n_5$, $n_6$, $n_7$, $n_8$, and $n_9$ need not be equal.

The actual total number of coil turns provided in each slot for each phase is a function of (1) impedance constraints and (2) the input excitation voltage in the case of motors, or the output voltage in the case of generators, when the machine is eventually used. Generally, the number of coil turns provided is the same normally used for similar rotary devices of the type having a uniform slot distribution and the same number of slots and poles, and adapted to be used with the same number of phases of the voltage field. However, the equations (15)-(26) must be satisfied. For example, the motor shown in the FIGURE for use with a 120 volt, three-phase excitation source can have the following coil turns in each slot for each phase, wherein the + and − signs are used to designate the direction of the turns.

TABLE 2

| SLOT | COIL TURNS PHASE #1 | COIL TURNS PHASE #2 | COIL TURNS PHASE #3 |
|---|---|---|---|
| 1 | +20 | −20 | 0 |
| 2 | +20 | 0 | −20 |
| 3 | +20 | 0 | −20 |
| 4 | +20 | 0 | −20 |

TABLE 2-continued

| SLOT | COIL TURNS PHASE #1 | COIL TURNS PHASE #2 | COIL TURNS PHASE #3 |
|---|---|---|---|
| 5 | +20 | 0 | −20 |
| 6 | 0 | +20 | −20 |
| 7 | +20 | 0 | −20 |
| 8 | 0 | +20 | −20 |
| 9 | 0 | +20 | −20 |
| 10 | 0 | +20 | −20 |
| 11 | 0 | +20 | −20 |
| 12 | −20 | +20 | 0 |
| 13 | 0 | +20 | −20 |
| 14 | −20 | +20 | 0 |
| 15 | −20 | +20 | 0 |
| 16 | −20 | +20 | 0 |
| 17 | −20 | +20 | 0 |
| 18 | −20 | 0 | +20 |
| 19 | −20 | +20 | 0 |
| 20 | −20 | 0 | +20 |
| 21 | −20 | 0 | +20 |
| 22 | −20 | 0 | +20 |
| 23 | −20 | 0 | +20 |
| 24 | 0 | −20 | +20 |
| 25 | −20 | 0 | +20 |
| 26 | 0 | −20 | +20 |
| 27 | 0 | −20 | +20 |
| 28 | 0 | −20 | +20 |
| 29 | 0 | −20 | +20 |
| 30 | +20 | −20 | 0 |
| 31 | 0 | −20 | +20 |
| 32 | +20 | −20 | 0 |
| 33 | +20 | −20 | 0 |
| 34 | +20 | −20 | 0 |
| 35 | +20 | −20 | 0 |
| 36 | +20 | 0 | −20 |

The angular positions of each of the slots 1-36 can now be adjusted to render to substantially zero these remaining harmonics, the number being dependent upon the number of independent variables determined by equation (1). Specifically, where N=1, the value of $\theta_1$ can be computed to reduce the fifth harmonic to zero. Where N=2, the values of $\theta_1$ and $\theta_2$ can be derived to reduce the fifth and seventh harmonics to zero. In the case of the example provided by the FIGURE wherein N=3 for a three-phase, two-pole, 36 slot machine, the positions of $\theta_1$, $\theta_2$ and $\theta_3$ can be determined so as to reduce the fifth, seventh and eleventh harmonics to zero. More particularly, since there are three independent variables to be determined the first three harmonic component coefficients $b_5$, $b_7$ and $b_{11}$ can be defined as follows:

$$b_5 = \frac{1}{\pi} \int_0^{2\pi} g(\theta) \sin 5\theta \, d\theta = \frac{1}{\pi} \sum_{i=1}^{N} n_i \sin 5\theta_i, \quad (27)$$

$$b_7 = \frac{1}{\pi} \int_0^{2\pi} g(\theta) \sin 7\theta \, d\theta = \frac{1}{\pi} \sum_{i=1}^{N} n_i \sin 7\theta_i, \quad (28)$$

$$b_{11} = \frac{1}{\pi} \int_0^{2\pi} g(\theta) \sin 11\theta \, d\theta = \frac{1}{\pi} \sum_{i=1}^{N} n_i \sin 11\theta_i, \quad (29)$$

wherein
$g(\theta)$ is a summation of impulse functions located at the angle of the slot, $g(\theta) = \Sigma\delta(\theta_i)$; and
$n_i$ is the number of windings of the ith slot Given equations (27), (28) and (29) it is now desirable to solve them so that the coefficients $b_5$, $b_7$ and $b_{11}$ are each equal to zero. Generally, the approach is to assume a starting angle for each slot position, linearize the sine functions around this angle and solve for the angle increment, ie. the amount the angle should be changed from the assumed position. The process is repeated for the angle of each slot position using the new slot position calculated by adding or subtracting the angle increment to the previously assumed angle. The process is continuously repeated until the increments decrease to substantially zero.

More specifically, the slot positions can be determined by linearizing the system of non-linear equations (27), (28) and (29) by taking slopes about the starting point of the assumed slot position. This linearization is accomplished by using the partial differential equations with respect to these three coefficients which are known:

$$(\delta a_5/\delta\theta_1)d\theta HD \ 1 + (\delta a_5/\delta\theta HD \ 2)d\theta_2 + (\delta a_5/\delta\theta_3)d\theta HD \ 3 = -a_5 \quad (30)$$

$$(\delta a_7/\delta\theta_1)d\theta_1 + (\delta a_7/\delta\theta_2)d\theta_2 + (\delta a_7/\delta\theta_3)d\theta_3 = -a_7 \quad (31)$$

$$(\delta a_{11}/\delta\theta_1)d\theta_1 + (\delta a_{11}/\delta\theta_2)d\theta_2 + (\delta a_{11}/\delta\theta_3)d\theta_3 = -a_{11} \quad (32)$$

From equations (27)–(32), by starting with arbitrary values of $\theta_1$, $\theta_2$ and $\theta_3$ (for example, 82.5°, 75.0° and 67.5°, or perfect slot symmetry), new values of $\theta_1'$, $\theta_2'$ and $\theta_3'$ can be determined, i.e., values of $\theta_1 + d\theta_1$, $\theta_2 + d\theta_2$, $\theta_3 + d\theta_3$ wherein, $\theta_1$, $\theta_2$ and $\theta_3$ are the original values and $d\theta_1$, $d\theta_2$ and $d\theta_3$ are the differential values provided from the simultaneous equations. The new values of $\theta_1'$, $\theta_2'$ and $\theta_3'$ are used in equations (27)–(32) to again determine new values of $\theta_1''$, $\theta_2''$ and $\theta_3''$ (provided by calculating new values of $d\theta_1$, $d\theta_2$ and $d\theta_3$ from the values of $\theta_1'$, $\theta_2'$ and $\theta_3'$. The process is repeated with as many iterations as necessary until the values of $\theta_1$, $\theta_2$ and $\theta_3$ converge to unique values. For the embodiment shown in the FIGURE, the values of $\theta_1$, $\theta_2$ and $\theta_3$ are easily determined as follows: $\theta_1 = 83.822421°$, $\theta_2 = 75.860838°$, and $\theta_3 = 67.096652°$. The convergence of the values $\theta_1$, $\theta_2$, and $\theta_3$ results in a reduction of a fifth, seventh and eleventh harmonics to substantially zero. Once the value of $\theta_1$, $\theta_2$ and $\theta_3$ are provided, the remaining slots can be determined from Table 1 above, and are indicated in the following Table 3.

TABLE 3

| SLOT NUMBER | ANGULAR POSTION (°) |
|---|---|
| 1 | 83.822421 |
| 2 | 75.860838 |
| 3 | 67.096652 |
| 4 | 52.903348 |
| 5 | 44.139162 |
| 6 | 36.177579 |
| 7 | 23.822421 |
| 8 | 15.860838 |
| 9 | 7.096652 |
| 10 | 352.903348 |
| 11 | 344.139162 |
| 12 | 336.177579 |
| 13 | 323.822421 |
| 14 | 315.860838 |
| 15 | 307.096652 |
| 16 | 292.903348 |
| 17 | 284.139162 |
| 18 | 276.177579 |
| 19 | 263.822421 |
| 20 | 255.860838 |
| 21 | 247.096652 |
| 22 | 232.903348 |
| 23 | 224.139162 |
| 24 | 216.177579 |
| 25 | 203.822421 |
| 26 | 195.860838 |
| 27 | 187.096652 |

TABLE 3-continued

| SLOT NUMBER | ANGULAR POSTION (°) |
|---|---|
| 28 | 172.903348 |
| 29 | 164.139162 |
| 30 | 156.177579 |
| 31 | 143.822421 |
| 32 | 135.860838 |
| 33 | 127.096652 |
| 34 | 112.903348 |
| 35 | 104.139162 |
| 36 | 96.177579 |

Thus, the resulting stator 104 with coil windings 106 of the three-phase system described will provide a current distribution in which all harmonics up to and including the eleventh are reduced to substantially zero.

The number of slots will always provide system symmetry since the same number of slots must be provided on each 90° quadrant. The exact location of slots which reduce the harmonics in the fields between the magnetic core elements of any multi-slot, multi-pole rotary machine can be easily determined. The slots can be determined regardless of the number of phases of the excitation voltage since the slots can be determined for as few as one-phase signals. The only limitation is one of a practical nature. If the determined position of one of the slots comes very close to an edge of the symmetrical segment as defined by equation (2) above, then as a practical matter two slots may overlap making the construction of the core element difficult if not impossible.

To illustrate the effect of the number of poles on the distribution the following example is given, which can be compared to the distribution associated with the description given above. When determining the slot distribution for a 4 pole, 36 slot, 3 phase motor, solving for N of equation (1) the number of degrees of freedom or variables is IP[1.5], or one. In this case $\theta_2$ will be fixed at the initial position of perfect slot symmetry at the 75.0° diagonal. $\theta_3$ will necessarily be dependent upon the position of $\theta_1$ in order to preserve the system symmetry. Using the integral equations of equations (27)–(29) and the partial differential equations (30)–(32), the position of $\theta_1$ can easily be determined to be 85.395319. Using Table 1 the remaining slot positions are determined and are detailed below in the following Table 4.

TABLE 4

| SLOT NUMBER | ANGULAR POSTION (°) |
|---|---|
| 1 | 85.395319 |
| 2 | 75.000000 |
| 3 | 64.604681 |
| 4 | 55.395319 |
| 5 | 45.000000 |
| 6 | 34.604681 |
| 7 | 25.395319 |
| 8 | 15.000000 |
| 9 | 4.604681 |
| 10 | 355.395319 |
| 11 | 345.000000 |
| 12 | 334.604681 |
| 13 | 325.395319 |
| 14 | 315.000000 |
| 15 | 304.604681 |
| 16 | 295.395319 |
| 17 | 285.000000 |
| 18 | 274.604681 |
| 19 | 265.395319 |
| 20 | 255.000000 |
| 21 | 244.604681 |
| 22 | 235.395319 |
| 23 | 225.000000 |
| 24 | 214.604681 |

TABLE 4-continued

| SLOT NUMBER | ANGULAR POSTION (°) |
|---|---|
| 25 | 205.395319 |
| 26 | 195.000000 |
| 27 | 184.604681 |
| 28 | 175.395319 |
| 29 | 165.000000 |
| 30 | 154.604681 |
| 31 | 145.395319 |
| 32 | 135.000000 |
| 33 | 124.604681 |
| 34 | 115.395319 |
| 35 | 105.000000 |
| 36 | 94.604681 |

As stated above by increasing the number of poles from two to four, one is decreasing the number of degrees of freedom as determined from equation (1). One can however gain an additional degree of freedom by determining the number of coil turns for each phase for each slot by referring to equation (13) and assuming that $n_1$ equals one turn and $n_6$ and $n_7$ are fractional turns, wherein $n_6$ is multiplied by a factor x and $n_7$ is multiplied by a factor $(1-x)$, wherein $0<x<1$. The factor x can then be determined by deriving a quadratic equation as a function of x from the converging equations (25)–(30). At least one real root will be derived when the quadratic equation is solved for x. In the present example, $x = 0.640410722$. Once x is determined the smallest whole integer is then determined which can be multiplied by the factor x and by the factor $(1-x)$ to provide substantially whole numbers as their products. More particularly, in the example given the smallest whole integer is 25 resulting in the following: $25x = 16.010$ and $25(1-x) = 8.989$. Thus, by setting $n_6 = 16$ turns and $n_7 = 9$ turns the core element can be wound in accordance with the following Table 5.

TABLE 5

| SLOT | COIL TURNS PHASE #1 | COIL TURNS PHASE #2 | COIL TURNS PHASE #3 |
|---|---|---|---|
| 1 | +25 | −16 | −9 |
| 2 | +25 | −25 | 0 |
| 3 | +16 | −25 | +9 |
| 4 | +9 | −25 | +16 |
| 5 | 0 | −25 | +25 |
| 6 | −9 | −16 | +25 |
| 7 | −16 | −9 | +25 |
| 8 | −25 | 0 | +25 |
| 9 | −25 | +9 | +16 |
| 10 | −25 | +16 | +9 |
| 11 | −25 | +25 | 0 |
| 12 | −16 | +25 | −9 |
| 13 | −9 | +25 | −16 |
| 14 | 0 | +25 | −25 |
| 15 | +9 | +16 | −25 |
| 16 | +16 | +9 | −25 |
| 17 | +25 | 0 | −25 |
| 18 | +25 | −9 | −16 |
| 19 | +25 | −16 | −9 |
| 20 | +25 | −25 | 0 |
| 21 | +16 | −25 | +9 |
| 22 | +9 | −25 | +16 |
| 23 | 0 | −25 | +25 |
| 24 | −9 | −16 | +25 |
| 25 | −16 | −9 | +25 |
| 26 | −25 | 0 | +25 |
| 27 | −25 | +9 | +16 |
| 28 | −25 | +16 | +9 |
| 29 | −25 | −25 | 0 |
| 30 | −16 | +25 | −9 |
| 31 | −9 | +25 | −16 |
| 32 | 0 | +25 | −25 |
| 33 | +9 | +16 | −25 |
| 34 | +16 | +9 | −25 |
| 35 | +25 | 0 | −25 |

TABLE 5-continued

| SLOT | COIL TURNS PHASE #1 | COIL TURNS PHASE #2 | COIL TURNS PHASE #3 |
|---|---|---|---|
| 36 | +25 | −9 | −16 |

Changing the number of slots has the following effect. A core element incorporating the present invention for use in an 18 slot, 2 pole three phase motor has the following general slot distribution shown in TABLE 6, the specific slot distribution shown in TABLE 7 and the coil turn distribution shown in TABLE 8.

TABLE 6

| SLOT NUMBER | ANGULAR POSITION (°) |
|---|---|
| 1 | $\theta_1$ |
| 2 | 60° |
| 3 | 120° − $\theta_1$ |
| 4 | 300° + $\theta_1$ |
| 5 | 0° |
| 6 | 420° − $\theta_1$ |
| 7 | 240° + $\theta_1$ |
| 8 | 300° |
| 9 | 360° − $\theta_1$ |
| 10 | 180° + $\theta_1$ |
| 11 | 240° |
| 12 | 300° − $\theta_1$ |
| 13 | 120° + $\theta_1$ |
| 14 | 180° |
| 15 | 240° − $\theta_1$ |
| 16 | 60° + $\theta_1$ |
| 17 | 120° |
| 18 | 180° − $\theta_1$ |

Calculating $\theta_1$, the latter equals 80.790639°.

TABLE 7

| SLOT NUMBER | ANGULAR POSITION (°) |
|---|---|
| 1 | 80.790639 |
| 2 | 60.000000 |
| 3 | 39.209361 |
| 4 | 20.790639 |
| 5 | 0.000000 |
| 6 | 339.209361 |
| 7 | 320.790639 |
| 8 | 300.000000 |
| 9 | 279.209361 |
| 10 | 260.790639 |
| 11 | 240.000000 |
| 12 | 219.209361 |
| 13 | 200.790639 |
| 14 | 180.000000 |
| 15 | 159.209361 |
| 16 | 140.790639 |
| 17 | 120.000000 |
| 18 | 99.209361 |

TABLE 8

| SLOT | COIL TURNS PHASE #1 | COIL TURNS PHASE #2 | COIL TURNS PHASE #3 |
|---|---|---|---|
| 1 | +25 | −9 | −16 |
| 2 | +25 | 0 | −25 |
| 3 | +16 | +9 | −25 |
| 4 | +9 | +16 | −25 |
| 5 | 0 | +25 | −25 |
| 6 | −9 | +25 | −16 |
| 7 | −16 | +25 | −9 |
| 8 | −25 | +25 | 0 |
| 9 | −25 | +16 | +9 |
| 10 | −25 | +9 | +16 |
| 11 | −25 | 0 | +25 |
| 12 | −16 | −9 | +25 |
| 13 | −9 | −16 | +25 |
| 14 | 0 | −25 | +25 |
| 15 | +9 | −25 | +16 |

TABLE 8-continued

| SLOT | COIL TURNS PHASE #1 | COIL TURNS PHASE #2 | COIL TURNS PHASE #3 |
|---|---|---|---|
| 16 | +16 | −25 | +9 |
| 17 | +25 | −25 | 0 |
| 18 | +25 | −16 | −9 |

The core element incorporating the present invention can be easily manufactured. For example, the core element can comprise a plurality of identical laminations of electromagnetically conductive sheet material of a type well known in the art, each sheet having the same thickness and being cut in a toroidal shape so that each has an identical radial cross-sectional shape. Once the slot distribution is determined in the manner described above, each lamination sheet can be placed on a die such as a "woodpecker" die and the slots punched at their predetermined locations. Generally, such dies are adapted to punch all of the slots simultaneously (as for example those used for large production runs), or are provided with suitable indexing means so that each slot is punched one at a time in succession (as for example those used for small production runs). The laminations are then suitably indexed and secured together so that the slots of all the laminations are aligned. Once the coil turns for each phase are determined for each slot the laminated core element can then be wound with the number of coil turns for each phase in a manner well known in the art.

While the machine of the figure is described as an induction motor and the stator has been described as having the variable slot distribution as well as defining the number of poles, it will be evident that the present invention can apply to other types of rotary machines and can define the slot and winding distribution of the rotor. For example, the present invention can be utilized in synchronous machines where the armature windings are distributed on the stator (or rotor, depending upon the design of the machine) in accordance with the principles of the present invention. Further, as well known in the art, an induction-type rotary machine can be provided with a wound rotor. This wound rotor can be of the type which can be connected to a source of balanced excitation voltage in the case of motors, or connected to provide a source of balanced excitation voltage in the case of generators. With a wound rotor the slot and primary winding distribution is one in accordance with the present invention. The wound rotor can be of the type provided with field windings, in which case the stator will have a slot and primary winding distribution in accordance with the present invention. In this latter situation, the rotor can be provided with salient poles or non-salient poles, depending upon the construction of the rotor. Further, although the embodiment shown in the FIGURE has been shown and described as a motor, the invention can be utilized in other rotary machines, such as generators. Thus, the winding distribution applies at least to the primary windings in induction-type machines and the armature windings in synchronous-type machines. The slots, while shown in the FIGURE as being of a constant width and depth, can be modified in accordance with any known technique to improve the performance of the machine. For example, the mouth of each slot can be partially closed to make the air gap between rotor and stator more uniform as taught in the Fink et al text, supra; page 18-17.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A $\phi$-phase electrodynamic rotary machine of the type including a pair of magnetic core elements coaxially mounted and rotatable relative to one another about a common axis, at least one of said core elements including a plurality of slots "s" formed in at least one of said core elements and a plurality of coil windings respectively wound in said slots, said slots and coil windings being circumferentially spaced in a predetermined pattern around at least one of said core elements about said common axis so that as said elements rotate relative to one another at a substantially constant speed in response to a balanced sinusoidal excitation signal having $\phi$ phases, the particular energy distribution around at least one of said core elements is a substantially balanced sinusoidal field around at least one of said core elements, said field providing a peak value for each of said $\phi$ phases, said peak values of said phases being equiangularly distributed around at least one of said core elements, and wherein said coil windings are wound in said slots so that the number of turns of each of the coil windings associated with each phase are such that the (6c+3) harmonics of said energy distribution for that phase are reduced to substantially zero, wherein c=any interger including zero, and wherein said predetermined pattern is such that (1) slots in each 90° quadrant of at least one of said core elements defined by mutually perpendicular radial axes extending normal to said common axis, are nonuniformly angularly spaced within said quadrant and symmetrically arranged with corresponding slots in each adjacent 90° quadrant about the radial axis disposed therebetween so as to reduce the even harmonics in said field to substantially zero;

(2) each of said 90° quadrants is divided into 90°/$\phi$ segments; and (3) the slots in each of said segments are symmetrically arranged with slots in each of the adjacent segments about a radially-directed line between adjacent segments so as to reduce at least the third and fifth harmonics of said balanced sinusoidal field to substantially zero.

2. A machine according to claim 1, wherein the number N of the positions of said slots which are independent variables is defined as:

IP(s/2($\phi$)(p))

wherein:

IP=the function "the integer part of";

s=the total number of slots to be provided in said one core member;

$\phi$=the total number of phases of said balanced sinusoidal signal; and p=the total number poles of said machine.

3. A machine according to claim 2, wherein N is at least one, and the position of at least one of said slots and those slots dependent on the position of said one slot are provided so as to reduce the fifth harmonic of said energy distribution to substantially zero.

4. A machine according to claim 3, wherein s equals 18.

5. A machine according to claim 4, wherein said slots are positioned in accordance with the following table:

TABLE 1

| SLOT NUMBER | ANGULAR POSITION (°) |
|---|---|
| 1 | $\theta_1$ |
| 2 | 60° |
| 3 | 120° − $\theta_1$ |
| 4 | 300° + $\theta_1$ |
| 5 | 0° |
| 6 | 420° − $\theta_1$ |
| 7 | 240° + $\theta_1$ |
| 8 | 300° |
| 9 | 360° − $\theta_1$ |
| 10 | 180° + $\theta_1$ |
| 11 | 240° |
| 12 | 300° − $\theta_1$ |
| 13 | 120° + $\theta_1$ |
| 14 | 180° |
| 15 | 240° − $\theta_1$ |
| 16 | 60° + $\theta_1$ |
| 17 | 120° |
| 18 | 180° − $\theta_1$ |

6. A machine according to claim 5, wherein $\theta_1 = 80.790639$.

7. A machine according to claim 3, wherein said slots in each segment are mutually positioned relative to one another so that the sum of all of the fifth harmonic components at said slots are reduced to substantially zero.

8. A machine according to claim 2, wherein N is at least three, and each of at least three of the slots and the slots dependent thereon are positioned so as to reduce the fifth, seventh and eleventh harmonics of said field to substantially zero.

9. A machine according to claim 8, wherein s equals 36.

10. A machine according to claim 9, wherein said slots are positioned in accordance with the following table:

TABLE 1

| SLOT NUMBER | ANGULAR POSITION (°) |
|---|---|
| 1 | $\theta_1$ |
| 2 | $\theta_2$ |
| 3 | $\theta_3$ |
| 4 | 120° − $\theta_3$ |
| 5 | 120° − $\theta_2$ |
| 6 | 120° − $\theta_1$ |
| 7 | $\theta_1$ − 60° |
| 8 | $\theta_2$ − 60° |
| 9 | $\theta_3$ − 60° |
| 10 | 420° − $\theta_3$ |
| 11 | 420° − $\theta_2$ |
| 12 | 420° − $\theta_1$ |
| 13 | $\theta_1$ + 240° |
| 14 | $\theta_2$ + 240° |
| 15 | $\theta_3$ + 240° |
| 16 | 360° − $\theta_3$ |
| 17 | 360° − $\theta_2$ |
| 18 | 360° − $\theta_1$ |
| 19 | $\theta_1$ + 180° |
| 20 | $\theta_2$ + 180° |
| 21 | $\theta_3$ + 180° |
| 22 | 300° − $\theta_3$ |
| 23 | 300° − $\theta_2$ |
| 24 | 300° − $\theta_1$ |
| 25 | $\theta_1$ + 120° |
| 26 | $\theta_2$ + 120° |
| 27 | $\theta_3$ + 120° |
| 28 | 240° − $\theta_3$ |
| 29 | 240° − $\theta_2$ |
| 30 | 240° − $\theta_1$ |
| 31 | $\theta_1$ + 60° |
| 32 | $\theta_2$ + 60° |
| 33 | $\theta_3$ + 60° |

TABLE 1-continued

| SLOT NUMBER | ANGULAR POSITION (°) |
|---|---|
| 34 | 180° − $\theta_3$ |
| 35 | 180° − $\theta_2$ |
| 36 | 180° − $\theta_1$ |

11. A machine according to claim 10, wherein the coil windings are distributed in accordance with the following relationship:

$n_1 = n_6 + n_7;$ $n_2 = n_5 + n_8;$ $n_3 = n_4 + n_9;$ $n_{10} = n_{15} + n_{16};$ $n_{11} = n_{14} + n_{17};$ $n_{12} = n_{13} + n_{18};$ $n_{19} = n_{24} + n_{25};$ $n_{20} = n_{23} + n_{26};$ $n_{21} = n_{22} + n_{27};$ $n_{28} = n_{33} + n_{34};$ $n_{29} = n_{32} + n_{35};$ $n_{30} = n_{31} + n_{36};$ wherein n equals the number of coil turns, and the subscript indicates the slot number.

12. A machine according to claim 10, wherein p=2, $\theta_1$=83.822421°, $\theta_2$=75.860838°; and $\theta_3$=67.096652°.

13. A machine according to claim 10, wherein p=4, $\theta_1$=85.395319, $\theta_2$=75.000000; and $\theta_3$=64.604681.

14. A core element for use in a 3-phase electrodynamic rotary machine of the type including a pair of magnetic core elements coaxially mounted and rotatable relative to one another about a common axis, said core element comprising:
a plurality of slots "s" formed in said core element for receiving a plurality of coil winding respectively wound in said slots, said slots being circumferentially spaced in a predetermined pattern around said core element about the central axis of said core element so that said predetermined pattern is such that those of said slots in each 90° quadrant of said core element, defined by mutually perpendicular radial axes extending normal to said common axis, are nonuniformly angularly spaced within said quandrant and symmetrically arranged with corresponding ones of said slots in each adjacent 90° quadrant about the radial axis disposed therebetween.

15. A core element according to claim 14, wherein s equals 18.

16. A core element according to claim 15, wherein said slots are positioned in accordance with the following table:

TABLE 1

| SLOT NUMBER | ANGULAR POSITION (°) |
|---|---|
| 1 | $\theta_1$ |
| 2 | 60° |
| 3 | 120° − $\theta_1$ |
| 4 | 300° + $\theta_1$ |
| 5 | 0° |
| 6 | 420° − $\theta_1$ |
| 7 | 240° + $\theta_1$ |
| 8 | 300° |
| 9 | 360° − $\theta_1$ |
| 10 | 180° + $\theta_1$ |
| 11 | 240° |
| 12 | 300° − $\theta_1$ |
| 13 | 120° + $\theta_1$ |
| 14 | 180° |
| 15 | 240° − $\theta_1$ |
| 16 | 60° + $\theta_1$ |
| 17 | 120° |
| 18 | 180° − $\theta_1$ |

17. A core element according to claim 16, wherein $\theta_1$=80.790639.

18. A core element according to claim 17, wherein s equals 36.

19. A core element according to claim 18, wherein said slots are positioned in accordance with the following table:

TABLE 2

| SLOT NUMBER | ANGULAR POSITION |
|---|---|
| 1 | $\theta_1$ |
| 2 | $\theta_2$ |
| 3 | $\theta_3$ |
| 4 | 120° − $\theta_3$ |
| 5 | 120° − $\theta_2$ |
| 6 | 120° − $\theta_1$ |
| 7 | $\theta_1$ − 60° |
| 8 | $\theta_2$ − 60° |
| 9 | $\theta_3$ − 60° |
| 10 | 420° − $\theta_3$ |
| 11 | 420° − $\theta_2$ |
| 12 | 420° − $\theta_1$ |
| 13 | $\theta_1$ + 240° |
| 14 | $\theta_2$ + 240° |
| 15 | $\theta_3$ + 240° |
| 16 | 360° − $\theta_3$ |
| 17 | 360° − $\theta_2$ |
| 18 | 360° − $\theta_1$ |
| 19 | $\theta_1$ + 180° |
| 20 | $\theta_2$ + 180° |
| 21 | $\theta_3$ + 180° |
| 22 | 300° − $\theta_3$ |
| 23 | 300° − $\theta_2$ |
| 24 | 300° − $\theta_1$ |
| 25 | $\theta_1$ + 120° |
| 26 | $\theta_2$ + 120° |
| 27 | $\theta_3$ + 120° |
| 28 | 240° − $\theta_3$ |
| 29 | 240° − $\theta_2$ |
| 30 | 240° − $\theta_1$ |
| 31 | $\theta_1$ + 60° |
| 32 | $\theta_2$ + 60° |
| 33 | $\theta_3$ + 60° |
| 34 | 180° − $\theta_3$ |
| 35 | 180° − $\theta_2$ |
| 36 | 180° − $\theta_1$ |

20. A core element according to claim 19, wherein the coil windings are distributed in accordance with the following relationship:

$n_1 = n_6 + n_7;$ $n_2 = n_5 + n_8;$ $n_3 = n_4 + n_9;$ $n_{10} = n_{15} + n_{16};$ $n_{11}=n_{14}+n_{17}$;

$n_{12}=n_{13}+n_{18}$;

$n_{19}=n_{24}+n_{25}$;

$n_{20}=n_{23}+n_{26}$;

$n_{21}=n_{22}+n_{27}$;

$n_{28}=n_{33}+n_{34}$;

$n_{29}=n_{32}+n_{35}$;

$n_{30}=n_{31}+n_{36}$;

wherein n equals the number of coil turns, and the subscript indicates the slot number.

21. A core element according to claim 19, wherein $p=2$, $\theta_1=83.822421°$, $\theta_2=75.860838°$; and $\theta_3=67.096652°$.

22. A core element according to claim 19, wherein $p=4$, $\theta_1=85.395319$, $\theta_2=75.000000$; and $\theta_3=64.604681$.

23. A core element according to claim 14, wherein the number N of the positions of said slots, which are independent variables is defined as:

IP[s/6(p)]

wherein

IP=the function "the integer part of";

s=the total number of slots to be provided in said one core member; and p=the total number poles of said machine.

* * * * *

UNITED STATES PATENT AND TRADEMARK OFFICE
CERTIFICATE OF CORRECTION

PATENT NO. : 4,508,989

DATED : April 2, 1985

INVENTOR(S) : Carleton E. Sawyer et al

It is certified that error appears in the above-identified patent and that said Letters Patent is hereby corrected as shown below:

IN THE DRAWINGS:

Please delete drawing Figures 1-5 now in the above-identified patent, and substitute the attached drawing Figure.

IN THE CLAIMS:

Claim 14, column 17, line 46, delete "winding" and substitute therefor -- windings --; and Claim 20, column 18, line 58, after "19", indert -- further including said coil windings respectively wound in said slots, --.

The title page showing the illustrative figure should be deleted to appear as per attached title page.

Signed and Sealed this

Tenth Day of December 1985

[SEAL]

Attest:

DONALD J. QUIGG

Attesting Officer

Commissioner of Patents and Trademarks

United States Patent

Sawyer et al.

[11] Patent Number: 4,508,989
[45] Date of Patent: Apr. 2, 1985

[54] CORE ELEMENT FOR ELECTRODYNAMIC ROTARY MACHINE

[75] Inventors: Carleton E. Sawyer, Littleton; Hugh C. Masterman, Westford, both of Mass.

[73] Assignee: Display Components, Inc., Westford, Mass.

[21] Appl. No.: 495,962

[22] Filed: May 19, 1983

[51] Int. Cl.³ .............................. H02K 3/00
[52] U.S. Cl. ........................ 310/184; 310/188; 310/198; 310/216
[58] Field of Search ............... 310/198–208, 310/187, 188, 180, 184, 216, 211, 212, 179, 192, 166, 171, 111, 261, 254, 258, 259; 318/496

[56] References Cited

U.S. PATENT DOCUMENTS

| | | | |
|---|---|---|---|
| 2,240,652 | 5/1941 | Jenkins | 310/180 |
| 2,679,605 | 5/1954 | Kilgore | 310/111 |
| 2,827,582 | 3/1958 | Krebs | 310/202 |
| 2,905,840 | 9/1959 | Dunn | 310/202 |
| 3,001,127 | 9/1961 | Pitches | 310/111 |
| 3,137,800 | 6/1964 | Young | 310/212 |
| 3,204,167 | 8/1965 | Zigler | 310/166 |
| 3,697,791 | 10/1972 | Kilgore | 310/111 |
| 3,778,652 | 12/1973 | Endress | 310/211 |
| 3,808,568 | 4/1974 | Sawyer | 335/213 |
| 4,241,274 | 12/1980 | Brammerlo | 310/216 |
| 4,264,836 | 4/1981 | Dukshtau | 310/216 |

OTHER PUBLICATIONS

"Semiconductor A-C Current Motor Drives & Energy Conservation"; by D. J. Ben Daniel et al; Science; vol. 206; Nov. 16, 1979; pp. 773–776.
"After 13 Years of Hot Windings Efficient Electric Motors Return", Product Engineering; May, 1977; pp. 43–46.
"Study of Variable Slot Pitch in Electric Machinery", A Report to Energy Research & Development Adm., by J. L. Kirtley, Jr.; Jul. 7, 1977.
"Standard Handbook for Electrical Engineers", by D. G. Fink et al., 1969, 10th Edition, pp. 18–17.

Primary Examiner—R. Skudy
Attorney, Agent, or Firm—Schiller & Pandiscio

[57] ABSTRACT

An improved magnetic core element for use in an electrodynamic rotary machine. The core element, either a stator or rotor depending upon the design of the machine, is provided with a slot distribution such that when the rotor rotates with respect to the stator and a balanced energy field is provided therebetween, at least the lowest generated harmonics, will be substantially zero.

23 Claims, 1 Drawing Figure